E. CARRAU.
SICKLE BAR ATTACHMENT FOR MOWING MACHINES.
APPLICATION FILED MAY 19, 1915.

1,179,401.

Patented Apr. 18, 1916.
2 SHEETS—SHEET 1.

Witnesses

E. Carrau,
Inventor
by C. A. Snow & Co.
Attorneys

E. CARRAU.
SICKLE BAR ATTACHMENT FOR MOWING MACHINES.
APPLICATION FILED MAY 19, 1915.
1,179,401.
Patented Apr. 18, 1916.
2 SHEETS—SHEET 2.
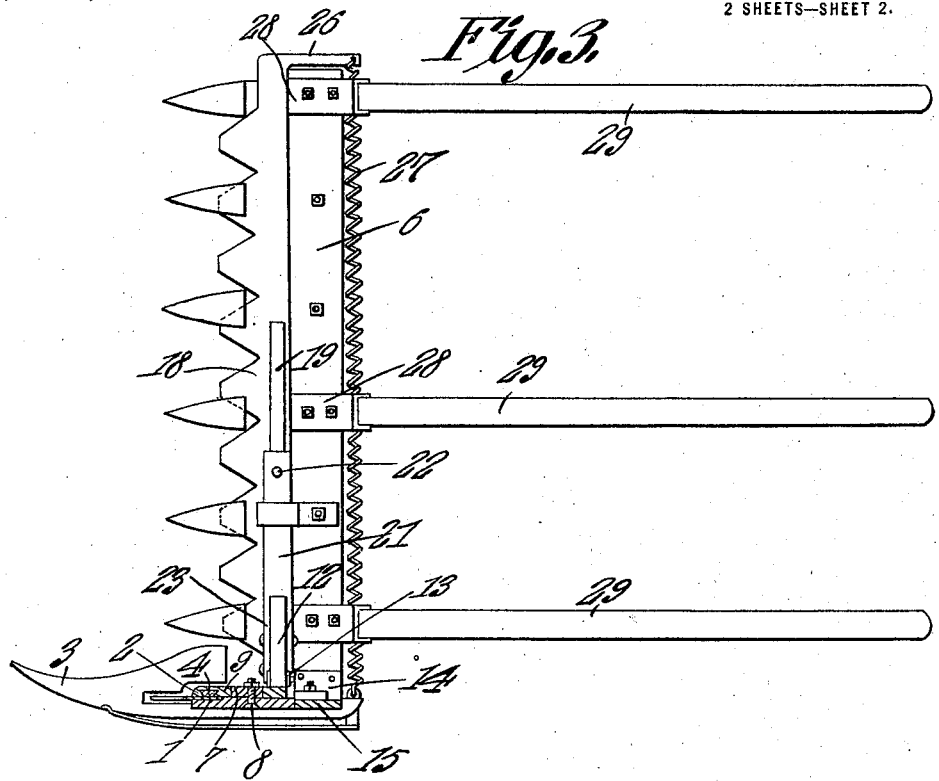
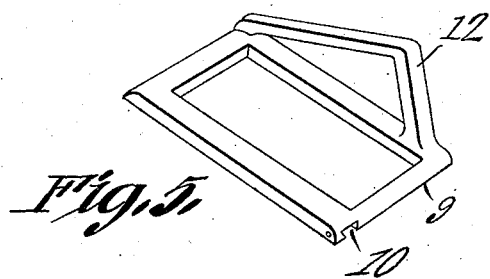
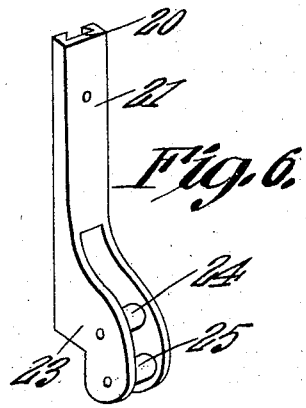
E. Carrau,
Inventor
Witnesses
by
Attorneys

UNITED STATES PATENT OFFICE.

EDUARD CARRAU, OF CATHLAMET, WASHINGTON, ASSIGNOR OF ONE-HALF TO PACIFIC CADEAU, OF CATHLAMET, WASHINGTON.

SICKLE-BAR ATTACHMENT FOR MOWING-MACHINES.

1,179,401.     Specification of Letters Patent.     Patented Apr. 18, 1916.

Application filed May 19, 1915. Serial No. 29,242.

*To all whom it may concern:*

Be it known that I, EDUARD CARRAU, a citizen of the United States, residing at Cathlamet, in the county of Wahkiakum and State of Washington, have invented a new and useful Sickle-Bar Attachment for Mowing-Machines, of which the following is a specification.

This invention relates to attachments for mowing machines whereby a vertical cut can be made at the outer end of the horizontal sickle-bar one of the objects of the invention being to provide an attachment of this character which can be applied readily to a harvester and which has simple and efficient means for transmitting motion from the sickle-bar of the harvester to the upwardly extending sickle-bar.

A further object is to provide an attachment which can be easily taken from position and which utilizes a sickle-bar which can be easily removed for the purpose of sharpening it.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
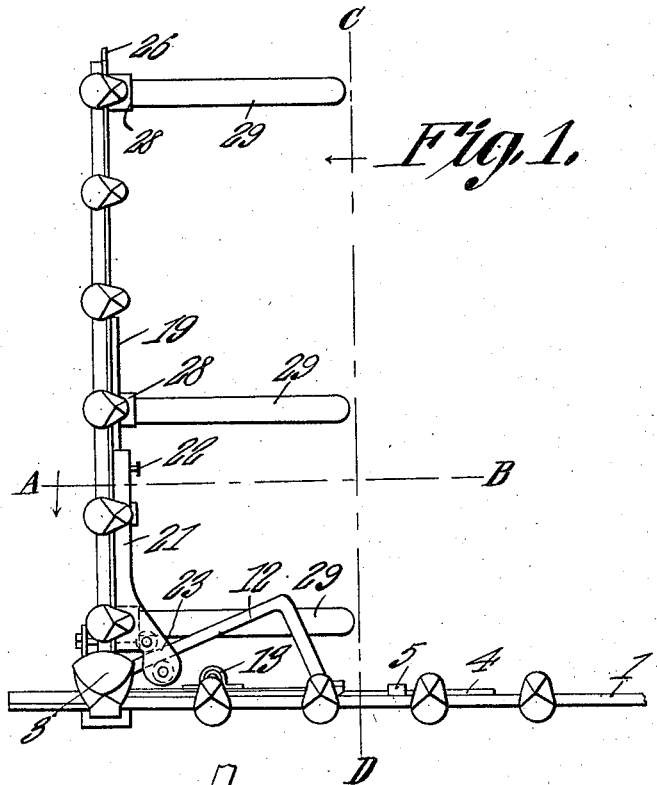
Figure 2:
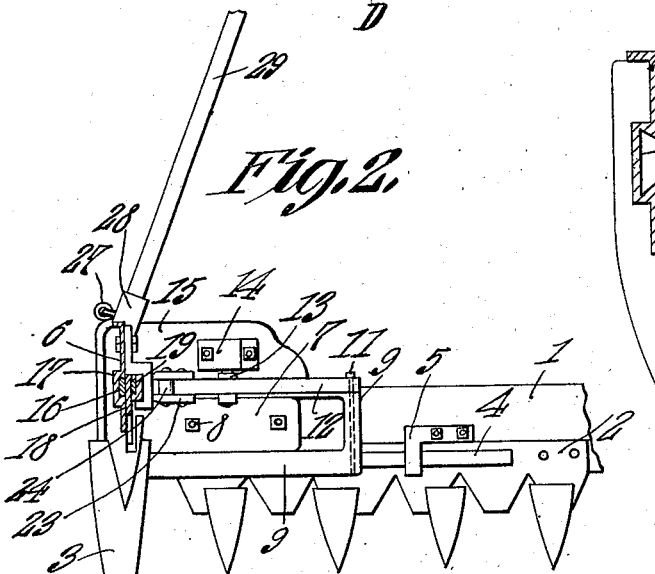
Figure 4:
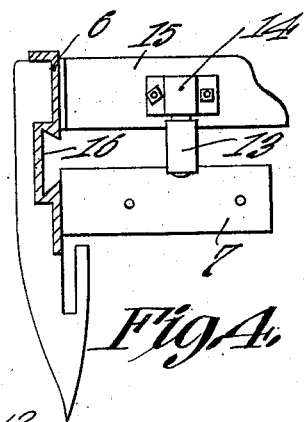

In said drawings:—Figure 1 is a front elevation of a portion of a harvester having the present improvement combined therewith. Fig. 2 is a section on the line A—B Fig. 1. Fig. 3 is a section on the line C—D Fig. 1. Fig. 4 is a horizontal section through the lower portion of the finger bar of the attachment and showing the base. Fig. 5 is a perspective view of the actuating cam. Fig. 6 is a perspective view of the member engaged and actuated by the cam.

Referring to the figures by characters of reference 1 designates the finger bar of an ordinary harvester, the same being slidably engaged by a cutter or sickle-bar 2. The finger bar 1 is provided at its outer end with a guard 3 and secured upon the sickle-bar 2 is a dove-tailed rib 4 slidably engaging a retaining bracket 5 which extends thereover from the finger bar 1. Arranged at the outer end of the finger bar 1 is a vertical finger bar 6 having a base 7 adapted to be secured upon the finger bar 1 by means of bolts 8. This base 7 is adapted to be slidably engaged by a frame 9 having a longitudinal dove-tailed groove 10 into which the rib 4 extends. A transverse holding pin 11 extends through one end of the frame and into engagement with the rib 4 for the purpose of coupling frame 9 to the rib 4 whereby the reciprocation of sickle-bar 2 will result in the reciprocation of frame 9. The frame 9 has an upstanding triangular cam 12 and the rear portion of the frame 9 rides under a guide roller 13 extending forwardly from a bearing 14 secured on a bracket 15 which is secured to the lower portion of the finger bar 8 and back of the finger 1. The upstanding finger bar 6 is formed with a longitudinal dove-tailed groove 16 in which is slidably mounted dove-tail rib 17 formed upon the outer face of the vertical sickle-bar 18. This vertical sickle-bar is formed, on its inner face, with a longitudinal dove-tail rib 19 and the said rib is engaged within a dove-tailed groove 20 formed within an arm 21. This arm is adapted to receive a locking pin 22 whereby it can be secured detachably to the rib 19, thus to couple arm 21 in the vertical sickle-bar 18. The arm 21 has a forked laterally projecting lower end 23 which straddles the cam 12 and carries spaced upper and lower rollers 24 and 25 respectively between which is slidably mounted one of the inclined upper portions of the cam 12. An arm 26 is extended rearwardly from the upper end portion of the sickle-bar 18 and is connected by a coiled spring 27 to the bracket 15 and serves to hold the sickle-bar 18 normally pulled downwardly. Socket members 28 are connected to the finger bar 6 and have rearwardly extending guard fingers 29 secured thereto.

It is to be understood that the sickle-bar 2 is to be reciprocated in the usual or any preferred manner but each time it is moved toward the guard finger 3, it thrusts the cam 12 longitudinally between the rollers 24 and 25 so as to push upwardly on the roller 24 and cause arm 21 to thrust upwardly through the rib 19 upon the sickle-bar 18. When sickle-bar 2 is moved away from the guard finger 3, the foregoing movement will be reversed, assisted by the spring 27. Should it be desired to move the upstanding sickle-bar 18 for the purpose of sharpening it, it would merely be necessary to detach the spring 27 from arm 26 and to remove pin 22 whereupon the said sickle-bar can be lifted out of position, the rib 19 sliding out of arm 21 while the rib 17 slides out of position within the dove-tailed groove 16 in the finger bar. Should it be desired to remove the attachment bodily from the harvester, it would merely be necessary to remove the bolt 8, thus to unfasten the base 7 from the finger bar 1. The pin 11 should likewise be removed after which the entire attachment can be slid bodily off of the finger bar 1 and the sickle bar 2.

Having thus described the invention, what is claimed is:—

1. The combination with the finger bar and sickle bar of a harvester, of an attachment therefor including an upstanding finger bar, a base thereon, means for detachably securing the base and the finger bar of the harvester, an upstanding sickle bar slidably engaging the upstanding finger bar, a yieldable connection between the said upstanding sickle bar and the lower portion of the upstanding finger bar, an arm detachably and adjustably connected to the upstanding sickle bar, spaced rollers carried thereby, a cam mounted to slide upon the finger bar of the harvester and having an inclined portion working between the rollers, and means for rigidly coupling said cam to the sickle bar of the harvester.

2. The combination with the finger bar and sickle bar of the harvester, and ribs extending longitudinally of and movable with said finger bar, of an upstanding finger bar having a base secured upon the finger bar of the harvester, a frame slidably mounted on the base and detachably connected to the rib on the finger bar, an upstanding cam upon the frame and including an inclined portion, a sickle bar mounted for reciprocation upon the upstanding finger bar, an arm detachably and adjustably connected to the sickle bar, and spaced rollers carried by the arm for receiving the inclined portion of the cam therebetween.

3. The combination with a finger bar and sickle bar of a harvester, of an upstanding finger bar having a base detachably secured upon said finger bar, a frame straddling the base and slidable on the finger bar, means for detachably securing said frame to the sickle bar, an upstanding cam upon the frame and having an inclined portion, an arm adjacent the upstanding finger bar, spaced rollers carried thereby and receiving the inclined portion of the cam therebetween, an upstanding sickle bar, and a longitudinal rib upon said sickle bar detachably and adjustably connected to the arm, said sickle bar being removable from the finger bar independently of the arm.

In testimony that I claim the foregoing as my own, I have hereto affixed my signature in the presence of two witnesses.

EDUARD CARRAU.

Witnesses:
GEO. F. HANIGAN,
BLANCHE HERON.

Copies of this patent may be obtained for five cents each, by addressing the "Commissioner of Patents, Washington, D. C."